US011258333B2

(12) United States Patent
Cottrell (10) Patent No.: US 11,258,333 B2
(45) Date of Patent: Feb. 22, 2022

(54) PROPULSOR SYSTEM WITH INTEGRATED PASSIVE COOLING

(71) Applicant: The Aurora Flight Sciences Corporation, a subsidiary of The Boeing Company, Manassas, VA (US)

(72) Inventor: Daniel B. Cottrell, Centreville, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 217 days.

(21) Appl. No.: 16/524,895

(22) Filed: Jul. 29, 2019

(65) Prior Publication Data

US 2021/0036580 A1 Feb. 4, 2021

(51) Int. Cl.
| *H02K 9/06* | (2006.01) |
| *H02K 5/20* | (2006.01) |
| *B64D 33/08* | (2006.01) |
| *B64C 27/32* | (2006.01) |
| *B64D 27/24* | (2006.01) |
| *B64C 39/02* | (2006.01) |

(52) U.S. Cl.
CPC ............... *H02K 9/06* (2013.01); *B64C 27/32* (2013.01); *B64C 39/024* (2013.01); *B64D 27/24* (2013.01); *B64D 33/08* (2013.01); *H02K 5/20* (2013.01); *B64C 2201/027* (2013.01); *B64C 2201/042* (2013.01); *H02K 2205/09* (2013.01)

(58) Field of Classification Search
CPC ........ H02K 9/06; H02K 2205/09; H02K 5/20; H02K 1/20; H02K 1/32; B64D 27/24; B64D 33/08; Y02E 10/72; B64C 2201/027; B64C 2201/042; B64C 27/32; B64C 39/02; B64C 39/024; Y02T 50/60; Y02T 50/40
See application file for complete search history.

(56) References Cited

U.S. PATENT DOCUMENTS

| 4,587,804 | A | * | 5/1986 | Horinouchi | ............... | F02K 1/36 60/230 |
| 5,154,052 | A | * | 10/1992 | Giffin, III | ................. | F02K 1/62 60/262 |
| 5,165,228 | A | * | 11/1992 | Enderle | ................... | F02C 7/042 60/244 |
| 6,191,511 | B1 | * | 2/2001 | Zysset | ..................... | H02K 9/19 310/53 |
| 6,492,743 | B1 | * | 12/2002 | Appa | ....................... | F01D 1/32 290/55 |
| 2005/0103933 | A1 | * | 5/2005 | Lair | ......................... | F02K 1/09 244/11 OB |

(Continued)

*Primary Examiner* — Naishadh N Desai
(74) *Attorney, Agent, or Firm* — Duft & Bornsen, PC (57) ABSTRACT

Propulsors (e.g., an electric motor mechanically coupled to a rotor) are described that passively cool the electric motors via an airflow path through the electric motor and out of the rotors. One embodiment comprises a method of cooling an electric motor. The method comprises operating the electric motor of a propulsor for an aircraft to rotate a rotor of the propulsor, where the rotor has one or more air outlets, and where the electric motor has a housing that includes one or more air inlets in fluid communication with the one or more air inlets. The method further comprises generating, by rotating the rotor using the electric motor, an airflow through the electric motor from the one or more air inlets to the one or more air outlets to cool the electric motor.

20 Claims, 13 Drawing Sheets

(56) References Cited

U.S. PATENT DOCUMENTS

| | | | |
|---|---|---|---|
| 2008/0020696 A1* | 1/2008 | Van Gansen | H02K 5/20 |
| | | | 454/126 |
| 2008/0042502 A1* | 2/2008 | VanLuik | H02K 9/22 |
| | | | 310/89 |
| 2009/0195089 A1* | 8/2009 | Huang | H02K 41/02 |
| | | | 310/12.29 |
| 2015/0344132 A1* | 12/2015 | Jeney | B64C 27/14 |
| | | | 244/17.11 |
| 2016/0141921 A1* | 5/2016 | Kubes | H02K 9/19 |
| | | | 310/54 |
| 2016/0153309 A1* | 6/2016 | Clairet | F01D 25/12 |
| | | | 415/116 |
| 2016/0204678 A1 | 7/2016 | Woolmer et al. | |

* cited by examiner

PROPULSOR SYSTEM WITH INTEGRATED PASSIVE COOLING

FIELD

This disclosure relates to the field of aircraft and, in particular, to aircraft that utilize electric motors to drive rotors.

BACKGROUND

Some aircraft utilize electric motors and rotors to generate lift and/or thrust for flight. During operation of the electric motors, heat is generated within the electric motors, which is typically dissipated using fins, radiators, liquid cooling loops, free airflow around the housing of the motor, etc. However, these types of cooling methods can add complexity and weight to aircraft, which is undesirable. Further, these types of cooling methods can be inadequate to maintain sufficient cooling for high performance electric motor implementations.

SUMMARY

Propulsors (e.g., an electric motor mechanically coupled to a rotor) are described that passively cool the electric motors via an airflow path through the electric motor and out of the rotors. Cooling air is passively drawn into the electric motor as the rotors rotate between one or more air inlets in the electric motor and one or more air outlets in the blades of the rotor. The use of passive cooling precludes the use of complicated cooling schemes for the electric motor, while improving the thermal performance of the electric motor.

One embodiment comprises a method of cooling an electric motor. The method comprises operating the electric motor of a propulsor to rotate a rotor of the propulsor, where the rotor has one or more air outlets, and where the electric motor has a housing that includes one or more air inlets in fluid communication with the one or more air inlets. The method further comprises generating, by rotating the rotor using the electric motor, an airflow through the electric motor from the one or more air inlets to the one or more air outlets to cool the electric motor.

Another embodiment comprises a propulsor to cool an electric motor. The propulsor includes a rotor and an electric motor. The rotor has a first interior passage extending from a hub along a blade to one or more air outlets. The electric motor includes a housing having one or more air inlets and a shaft mechanically coupled to the hub. The shaft includes a second interior passage that provides a flow path for an airflow through the electric motor from the one or more air inlets to the first interior passage to cool the motor.

Another embodiment comprises an aircraft equipped with one or more propulsors for cooling an electric motor. The one or more propulsors includes a rotor and an electric motor. The rotor has an interior passage in fluid communication with one or more air outlets, where the interior passage of the rotor extends from a hub of the rotor along a blade of the rotor to the one or more air outlets. The electric motor includes one or more air inlets and a hollow shaft mechanically coupled to the rotor and open to the interior passage that provides a flow path for an airflow through the electric motor from the one or more air inlets to the one or more air outlets to cool the electric motor.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
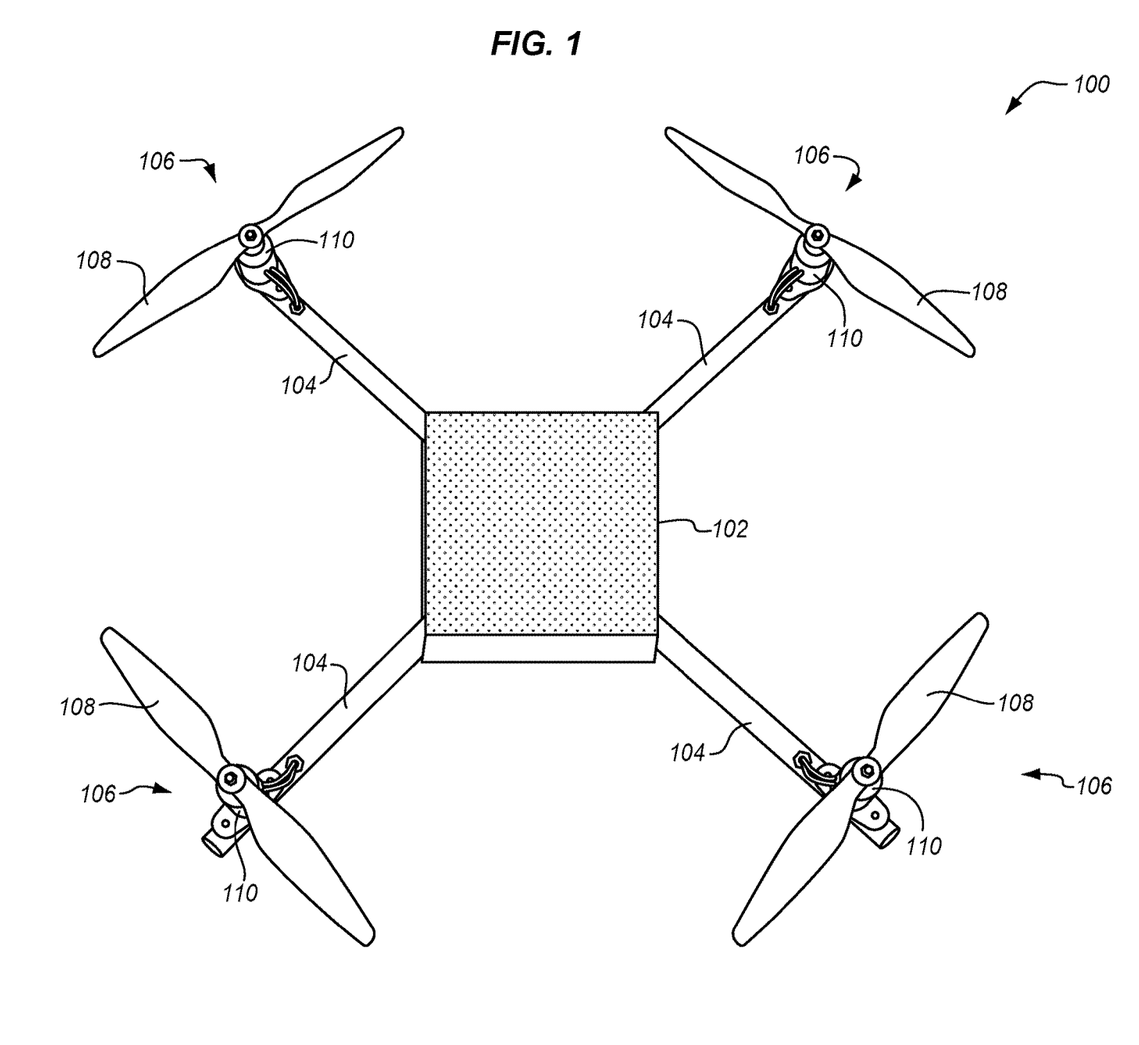
FIG. 1 is an isometric view of an aircraft in an illustrative embodiment.

FIG. 1 is an isometric view of an aircraft 100 in an illustrative embodiment. The structure of aircraft 100 is merely provided as an example, and the concepts described herein apply to any implementation that utilizes electric motors. In this example, aircraft 100 includes a fuselage 102, and support arms 104 that extend from fuselage 102. Distally located from fuselage 102 on support arms 104 are propulsors 106 that provide thrust for aircraft 100. Propulsors 106 include a rotor 108 that is mechanically coupled to an electric motor 110 via a shaft (not shown in this view). Although rotor 108 is depicted in FIG. 1 as having two blades, rotor 108 may have more blades in other embodiments. Rotor 108 is referred to a prop or propeller in some embodiments.

During flight operations, electric motors 110 rotate rotors 108 to generate thrust. The thrust generated by propulsors 106 allows aircraft 100 to hover, land, and generally translate in 3-dimensional space while in flight. As discussed previously, electric motors 110 generate heat while in operation, which may limit the performance of propulsors 106. In the embodiments described herein, propulsors 106 includes a path of airflow 206 through electric motors 110 and rotors 108 that passively cools electric motors 110. This allows aircraft 100 to operate at a higher performance level while avoiding the potential for reaching thermal limits or damaging electric motors 110.

Figure 2A:
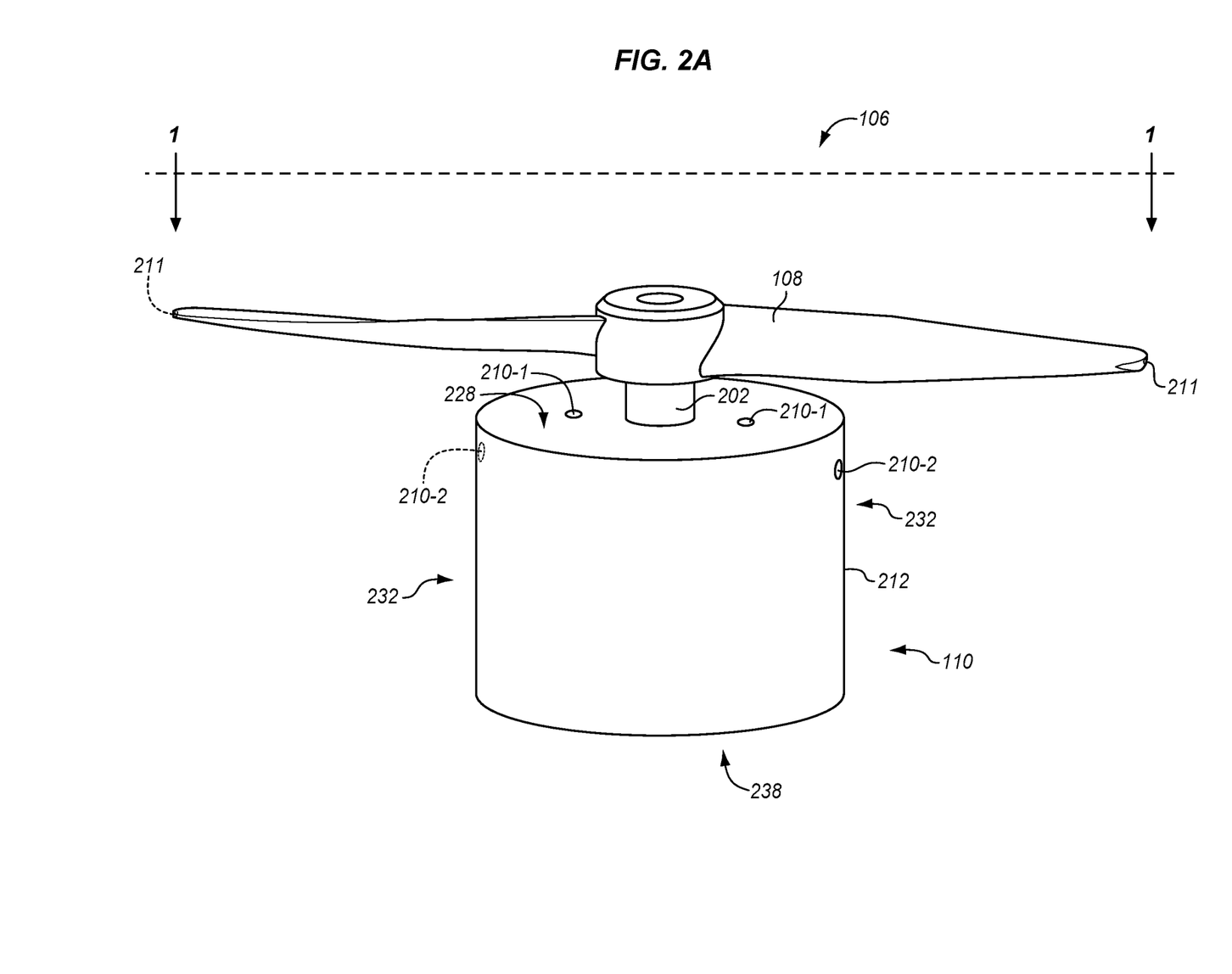
FIG. 2A is an isometric view of a propulsor for the aircraft of FIG. 1 in an illustrative embodiment.

FIG. 2A is an isometric view of propulsor 106 in an illustrative embodiment. In this embodiment, electric motor 110 includes a housing 212, which has a top 228 proximate to rotor 108, and a bottom 238 distal from rotor 108. Housing 212 of electric motor 110 includes one or more air inlets 210. More specifically, air inlets 210-1 are located at top 228 of housing 212 and air inlets 210-2 are located in sides 232 of housing 212. In this embodiment, a shaft 202 of electric motor 110 is mechanically coupled to rotor 108 and operates to spin rotor 108.

Figure 2B:
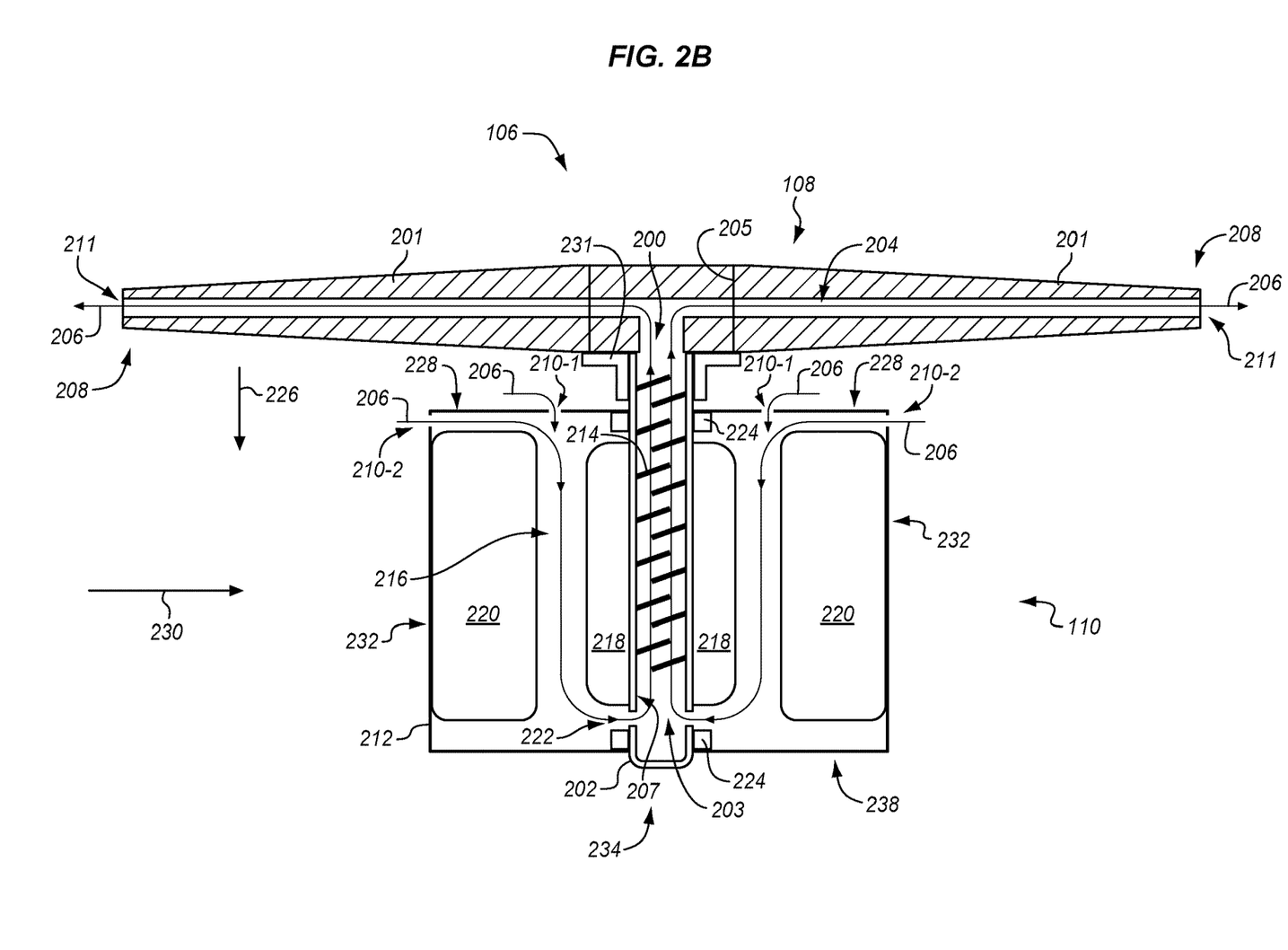
FIG. 2B is a cross-sectional view of a propulsor for the aircraft of FIG. 1 in another illustrative embodiment.

FIG. 2B is a cross-sectional view of propulsor 106 along cut lines 1-1 in an illustrative embodiment. The elements illustrated in FIG. 2B are simplified in order to aid in the discussion of the various aspects of the embodiments described herein, and therefore propulsor 106 may include other elements, not shown. During operation of propulsor 106, electric motor 110 spins shaft 202, which is mechanically coupled to rotor 108 at a hub 205 using an optional shaft adapter 231. The rotation of rotor 108 generates thrust for aircraft 100. In this embodiment, shaft 202 of electric motor 110 is rotationally coupled to housing 212 utilizing bearings 224.

Extending radially from hub 205 are blades 201, whose cross sections are composed of airfoils for rotor 108. In this embodiment, rotor 108 is mechanically coupled to shaft 202 at an end 200 of shaft 202. Shaft 202 includes a first interior passage 203 that extends from end 200 of shaft 202 to an end 234 of shaft 202. Further, rotor 108 includes a second interior passage 204 that extends from a hub 205 to one or more air outlets 211 that are proximate to blade tips 208. First interior passage 203 is in fluid communication with second interior passage 204. As shaft 202 rotates rotor 108, airflow 206 is drawn into air inlets 210 in a housing 212 of electric motor 110, which enters first interior passage 203 of shaft 202 at end 234 of shaft 202. Airflow 206 travels through first interior passage 203 of shaft 202 into second interior passage 204 of rotor 108, and is ejected at air outlets 211 in rotor 108. Airflow 206 through propulsor 106 passively removes heat from electric motor 110, which allows electric motor 110 to operate at higher levels of performance without incurring thermal damage or without depending upon the complexity of other types of cooling systems.

In some embodiments, the rotation of rotor 108 generates airflow 206 based on a differential pressure generated between air inlets 210 and air outlets 211. In other embodiments, the rotation of rotor 108 generates airflow 206 based on a centrifugal force which "slings" air out of air outlets 211 at blade tips 208. In other embodiments, the rotation of rotor 108 generates airflow 206 based on a downwash 226 generated as rotor 108 rotates. In one embodiment, downwash 226 directs airflow 206 into air inlets 210-1, which are located at top 228 of housing 212. In other embodiments, downwash 226 generates a pressure differential between air inlets 210 located at different positions along housing 212. In some embodiments, a motion of air 230 generated as aircraft 100 is in flight directs airflow 206 into air inlets 210-2, which are located on sides 232 of electric motor 110. In other embodiments, the motion of air 230 generated as aircraft 100 is in flight generates a pressure differential between air inlets 210 located at different position along housing 212.

In some embodiments, shaft 202 includes an interior feature similar to a helical pattern 214 of walls along an interior surface 207 of first interior passage 203, which are used to aid in promoting airflow 206 from end 234 of shaft 202 to end 200 of shaft 202. In the embodiment illustrated in FIG. 2B, airflow 206 enters housing 212 of electric motor 110 at air inlets 210-1 and air inlets 210-2 that are proximate to rotor 108, flows along an air gap 216 between a motor rotor 218 that surrounds shaft 202 and a stator 220, and enters opening 222 in shaft 202 at end 234 of shaft 202. Airflow 206 then travels within first interior passage 203 of shaft 202 from end 234 of shaft 202 towards end 200 of shaft 202, enters second interior passage 204 of rotor 108, and is ejected from second interior passage 204 at air outlets 211 of rotor 108. This flow path removes heat from stator 220 and motor rotor 218. Although a particular flow path is illustrated through electric motor 110 in FIG. 2B, other flow paths exist.

Figure 2C:
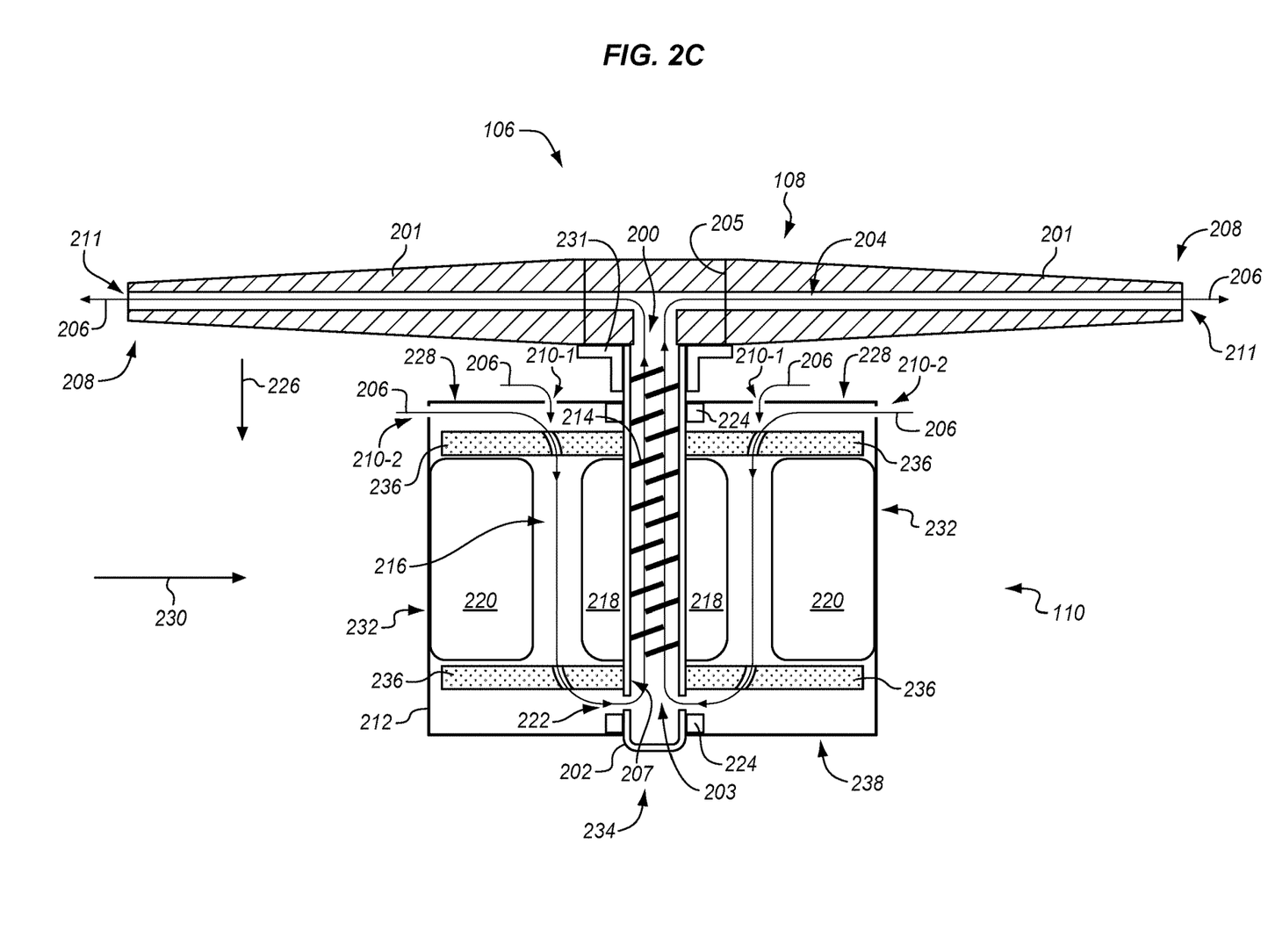
FIG. 2C is a cross-sectional view of a propulsor for the aircraft of FIG. 1 in another illustrative embodiment.

In some embodiments, airflow 206 enters housing 212 and provides cooling to power electronics 236 within motor 110 as illustrated in FIG. 2C, which may be located at various positions within housing 212.

Figure 3:
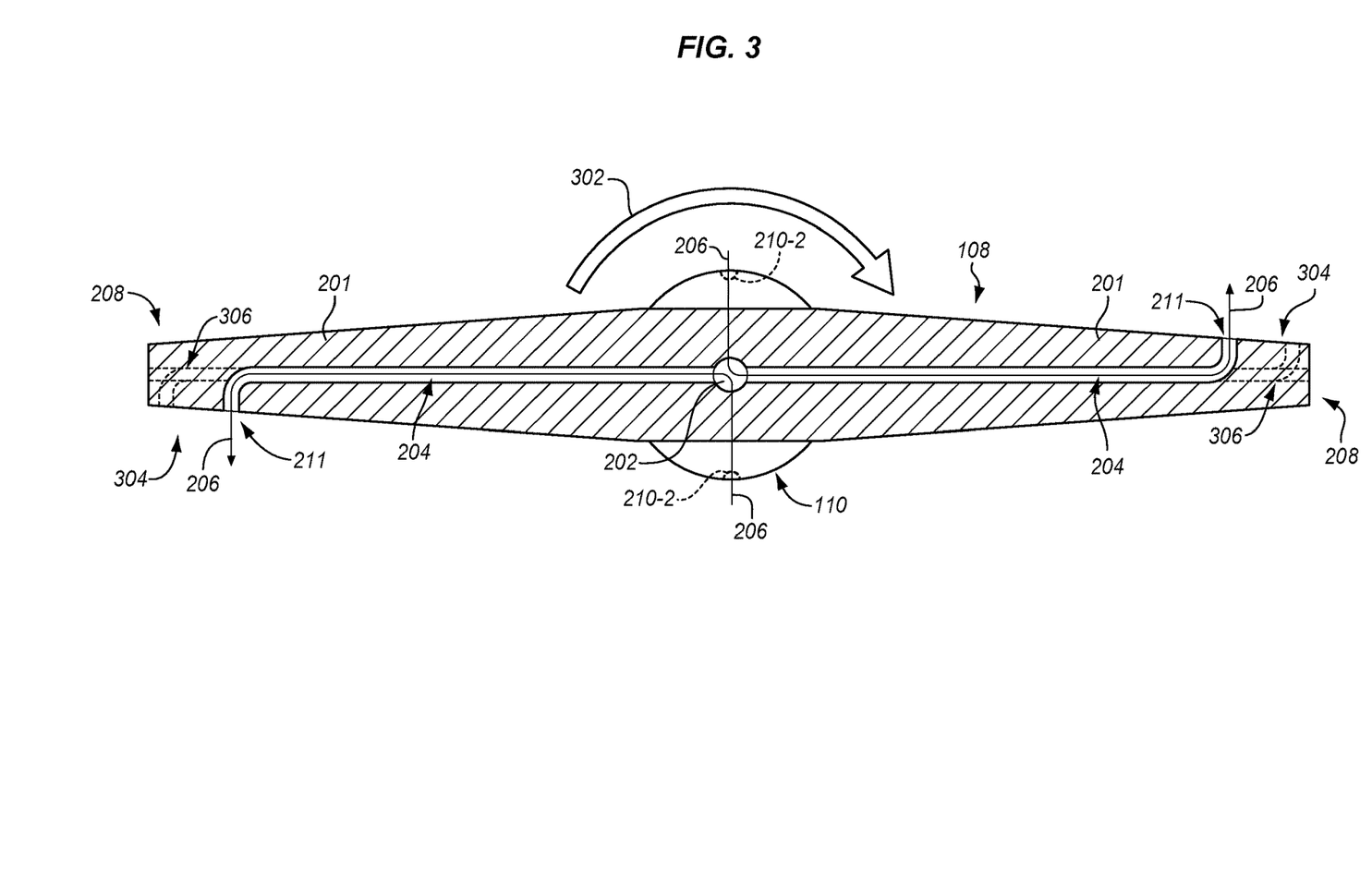
FIG. 3 depicts a top view of a rotor of the propulsor of FIG. 2 in an illustrative embodiment.

FIG. 3 depicts a top view of rotor 108 in an illustrative embodiment. Although the flow path of airflow 206 is ejected from second interior passage 204 proximate to blade tips 208 of rotor 108 as previously described with respect to FIG. 2A and FIG. 2B, in other embodiments, airflow 206 is ejected from rotor 108 at other positions located between shaft 202 of electric motor 110 and blade tips 208 as a matter of design choice. In the embodiment illustrated in FIG. 3, rotor 108 rotates in the direction indicated by arrow 302, with airflow 206 being ejected proximate to a trailing edge 304 of blades 201 at a position between shaft 202 of electric motor 110 and blade tips 208 of rotor 108. Dashed lines 306 illustrated in FIG. 3 illustrate optional ejection points in rotor 108 for airflow 206.

Figure 4:
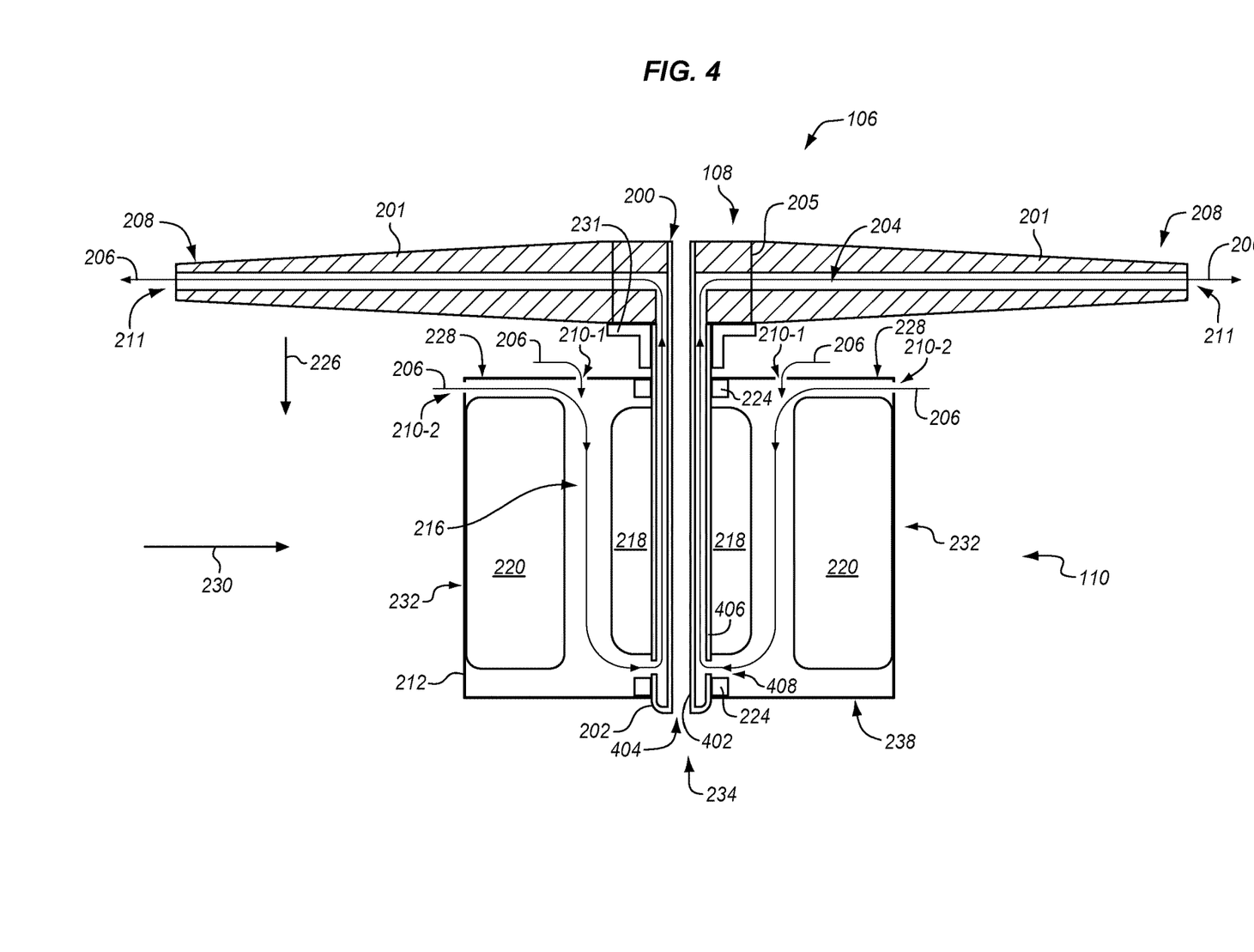
FIGS. 4-6 are cross-sectional views of the propulsor for the aircraft of FIG. 1 in various illustrative embodiments.

FIG. 4 is a cross-sectional view of propulsor 106 in another illustrative embodiment. In this embodiment, shaft 202 includes a utility channel 404 that begins outside of electric motor 110 at end 234 of shaft 202, and ends outside of rotor 108 at end 200 of shaft 202. Utility channel 404 is defined by an inner wall 402 of shaft 202. Utility channel 404 may be implemented to allow cables/wires to be extended through shaft 202 and rotor 108, such as might be used for a collective pitch system. Also illustrated in FIG. 4 is cooling channel 408, which is in fluid communication with second interior passage 204. Cooling channel 408 extends from end 234 of shaft 202 to hub 205, and directs airflow 206 through shaft 202 and into second interior passage 204 of rotor 108 as previously described with respect to FIG. 2. Cooling channel 408 is formed between an outer wall 406 of shaft 202 and inner wall 402 of shaft 202.

Figure 5:
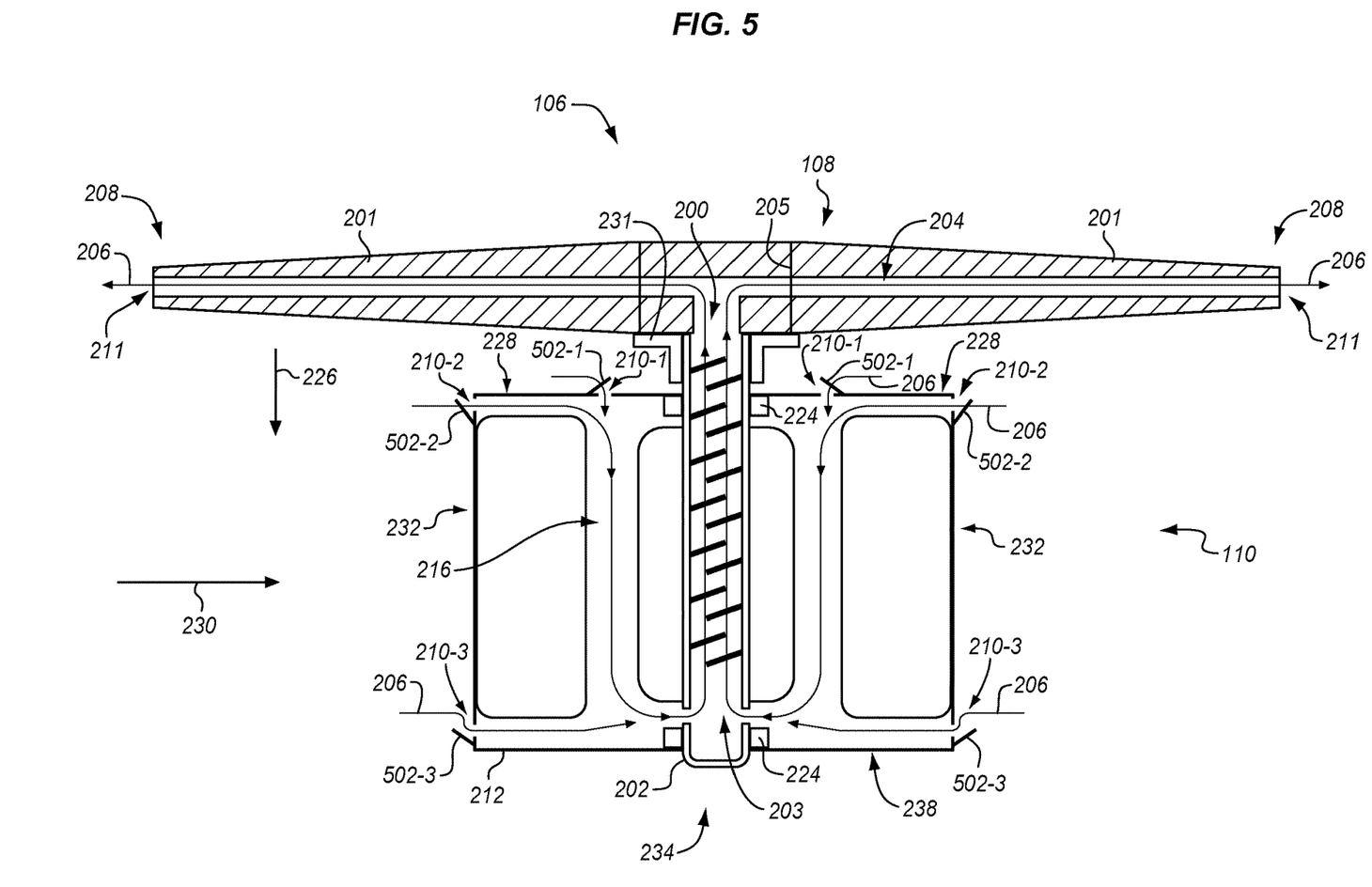

FIG. 5 is a cross-sectional view of propulsor 106 in another illustrative embodiment. In this embodiment, air inlets 210 include vent covers 502, which are used to modify a path of airflow 206 through electric motor 110. In particular, air inlets 210-1 in top 228 of housing 212 include vent covers 502-1, air inlets 210-2 in sides 232 of housing 212 include vent covers 510-2, and air inlets 210-3 along sides 232 and proximate to bottom 238 of housing 212 include vent covers 510-3.

With vent covers 502-1 and vent covers 502-2 open and vent covers 502-3 closed, airflow 206 enters top 228 of housing 212, flows through air gap 216 to bottom 238 of housing 212, and enters shaft 202 proximate to end 234 of shaft 202. With vent covers 502-1 and vent covers 502-2 closed and vent covers 502-3 open, airflow 206 enters side 232 of housing 212 proximate to bottom 238 of housing 212, bypasses air gap 216, and enters shaft 202 proximate to end 234 of shaft 202. Although only two flow paths are described with respect to FIG. 5, other flow paths may be implemented by modifying various combinations of vent covers 502. Vent covers 502 may be rotationally coupled to housing 212, slidably coupled to housing 212, etc.

Figure 6:
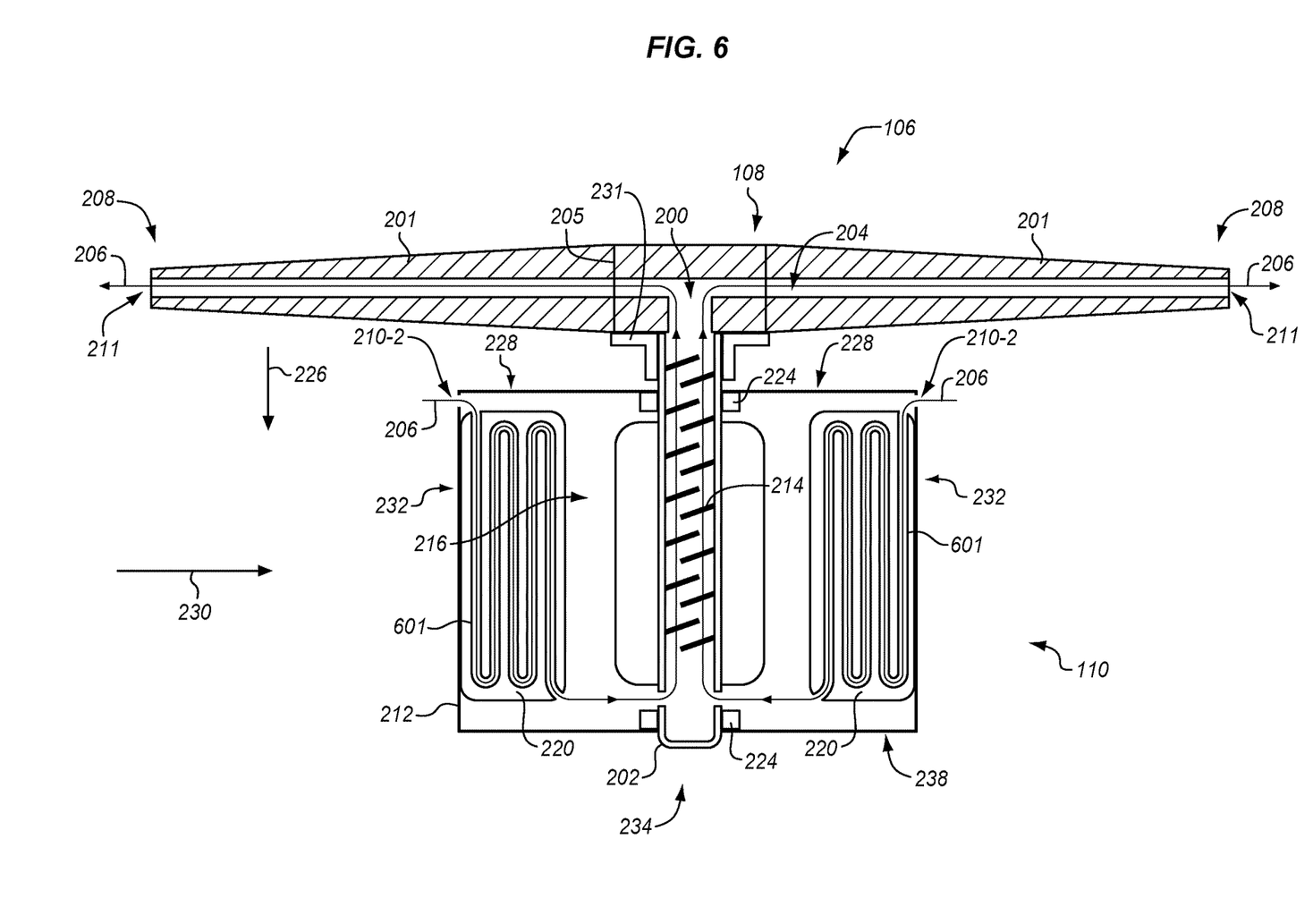

FIG. 6 is a cross-sectional view of propulsor 106 in another illustrative embodiment. In this embodiment, stators 220 include one or more channels 601 which provide a cooling path for airflow 206 through stators 220, thereby aiding in directly cooling stators 220 during operation of electric motor 110. Channels 601 may be referred to as interior channels in some embodiments.

Figure 7:
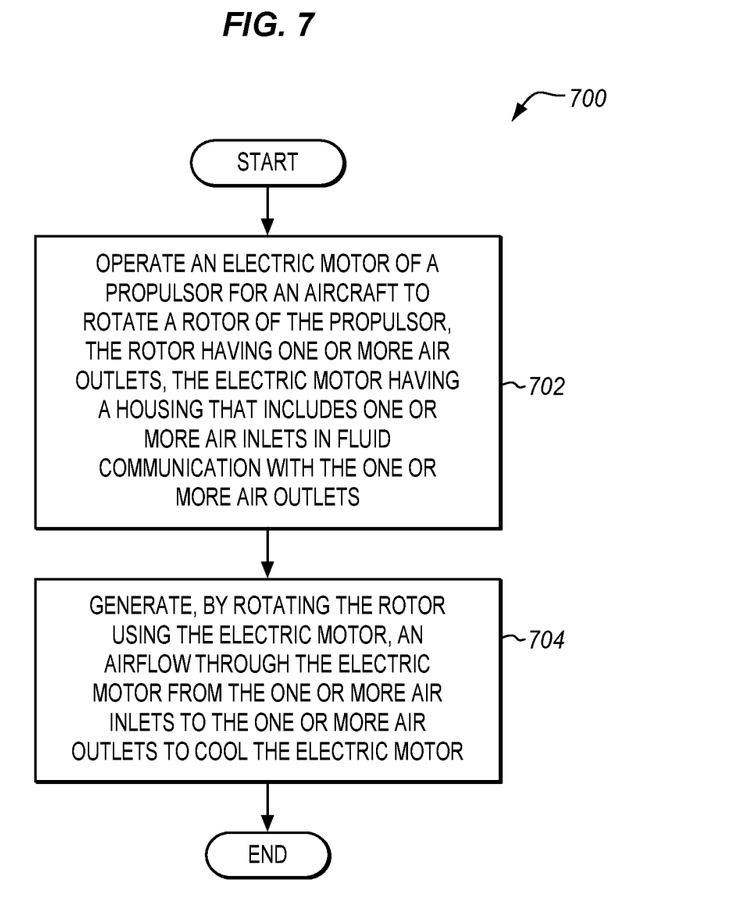
FIG. 7 is a flow chart of a method of operating the propulsor for the aircraft of FIG. 1 in an illustrative embodiment.
Figure 8:
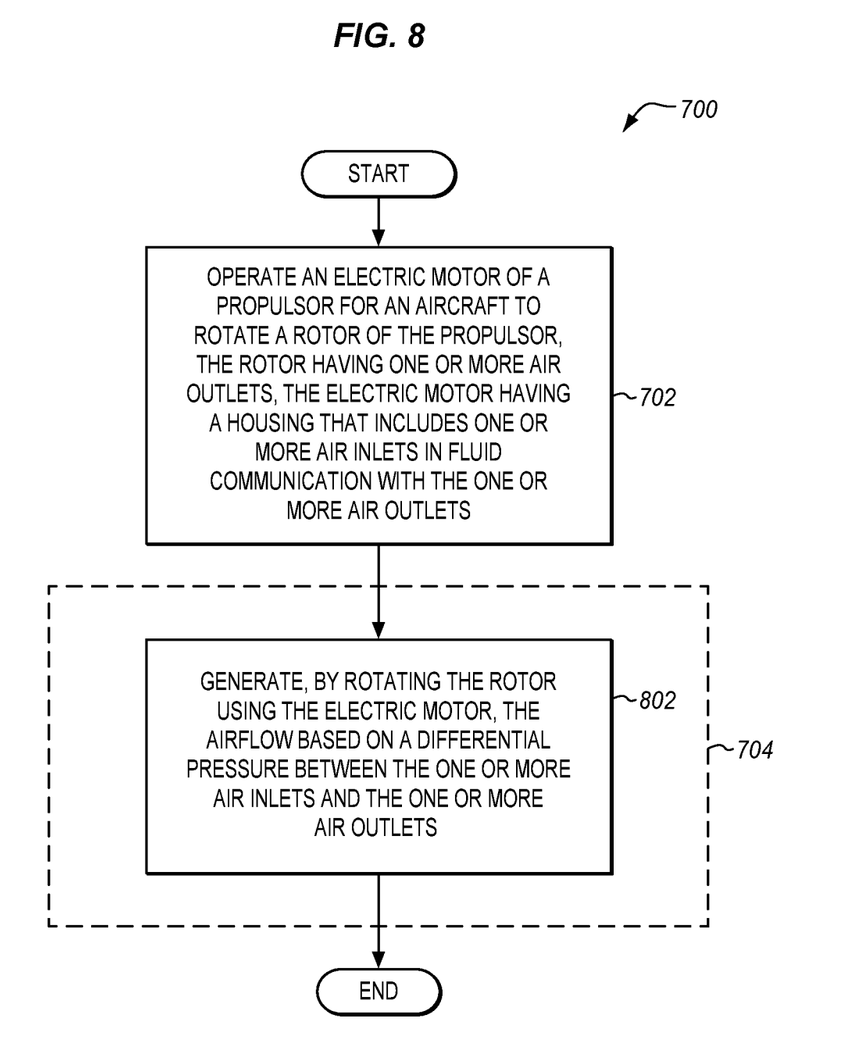
FIGS. 8-11 depict additional details for the method of FIG. 7 in various illustrative embodiments.
Figure 9:
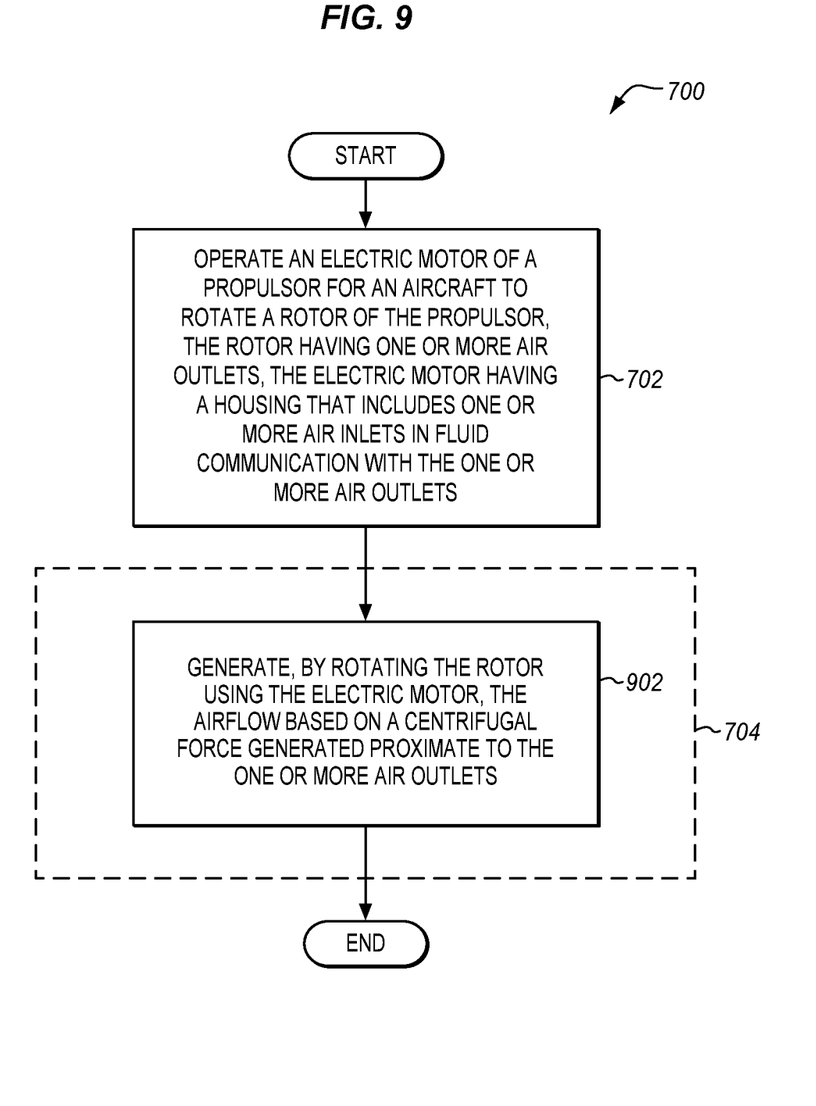
Figure 10:
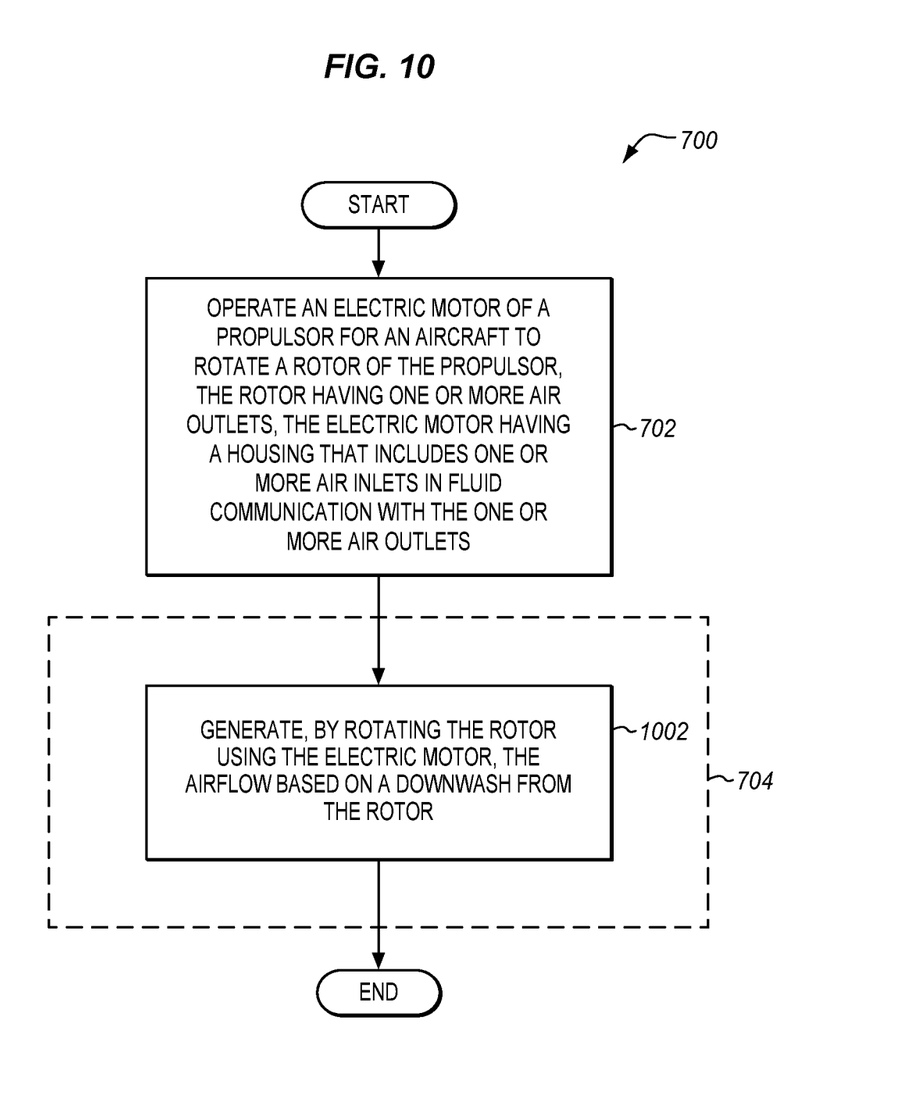

FIG. 7 is a flow chart of a method 700 of passively cooling an electric motor, and FIGS. 8-10 illustrate additional details of method 700. Method 700 will be described with respect to propulsor 106 and aircraft 100, although method 700 may apply to other propulsors, not shown. The steps of method 700 are not all inclusive, and may include other steps, not shown. Further, the steps of method 700 may be performed in an alternate order.

During operation of aircraft 100, electric motor 110 operates to rotate rotor 108 (see FIG. 7, step 702). As rotor 108 rotates, an airflow 206 is generated through electric motor 110 from one or more air inlets 210 to one or more air outlets 211 to cool electric motor 110 (see step 704). In some embodiments, rotating rotor 108 using electric motor 110 generates airflow 206 based on a differential pressure between air inlets 210 and air outlets 211 (see FIG. 8, step 802). In other embodiments, rotating rotor 108 using electric motor 110 generates airflow 206 based on a centrifugal force generated proximate to the air outlets 211 (see FIG. 9, step 902). In other embodiments, rotating rotor 108 using electric motor 110 generates airflow 206 based on downwash 226 from rotor 108 (see FIG. 10, step 1002). Generally, airflow 206 is generated based on any pressure gradient between air inlets 210 and air outlets 211.

Figure 11:
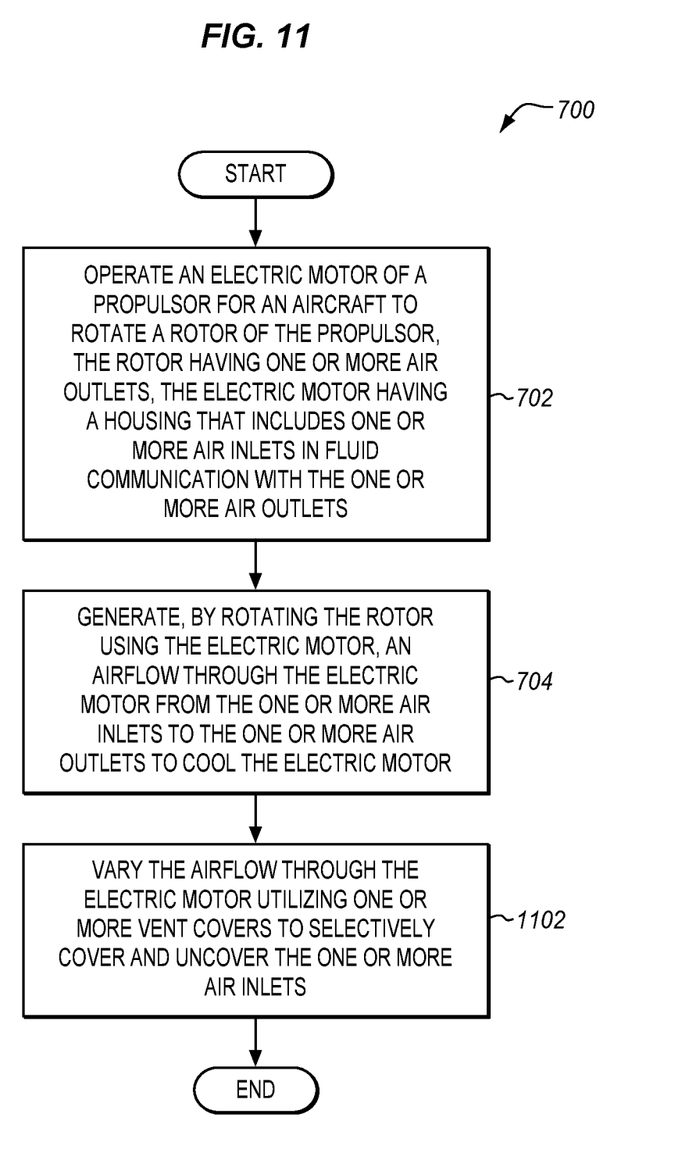

In some embodiments, airflow 206 is varied through electric motor 110 utilizing one or more vent covers 502 to selectively cover and uncover the one or more air inlets 210 (see FIG. 11, step 1102).

The use of passive cooling for propulsors 106 improves the heat rejection capabilities of electric motors 110, without the use of complicated cooling schemes that would add weight and complexity to propulsors 106. The reduction in either weight and/or complexity improves the reliability of aircraft 100. Further, although passive cooling of electric motors has been specifically described for aircraft using air, the concepts described herein for passively cooling electric motors generically apply for any embodiment that includes an electric motor driving a prop or rotor through air, water, or any other type of fluid. Some examples include electric motors for wind turbines, electric motors driving props for boats, etc.

Although specific embodiments were described herein, the scope is not limited to those specific embodiments. Rather, the scope is defined by the following claims and any equivalents thereof.

What is claimed is:

1. A method of cooling an electric motor, comprising:
operating the electric motor of a propulsor to rotate a rotor disposed outside a housing of the electric motor to propel the propulsor through an environment, the rotor having one or more air outlets, and the housing of the electric motor having one or more air inlets in fluid communication with the one or more air outlets; and
generating, by rotating the rotor using the electric motor, an airflow through the electric motor from the one or more air inlets to the one or more air outlets to cool the electric motor.

2. The method of claim 1, wherein generating the airflow further comprises:
generating, by rotating the rotor using the electric motor, the airflow based on a differential pressure between the one or more air inlets and the one or more air outlets.

3. The method of claim 1, wherein generating the airflow further comprises:
generating, by rotating the rotor using the electric motor, the airflow based on a centrifugal force generated proximate to the one or more air outlets.

4. The method of claim 1, wherein generating the airflow further comprises:
generating, by rotating the rotor using the electric motor, the airflow based on a downwash from the rotor.

5. The method of claim 1, wherein:
the one or more air inlets are located in a top of the housing that is proximate to the rotor.

6. The method of claim 1, wherein:
the airflow through the electric motor provides a flow path traversing an air gap between a stator of the electric motor and a motor rotor of the electric motor.

7. The method of claim 1, wherein:
the rotor includes blades extending radially from a hub that spins to generate thrust with the blades to propel the propulsor through the environment, wherein one or more of the blades include the one or more air outlets, and
the electric motor includes a hollow shaft mechanically coupled to the hub, wherein the hollow shaft is in fluid communication with the one or more air inlets and the one or more air outlets.

8. The method of claim 7, wherein:
the hollow shaft is in fluid communication with the one or more air inlets and the one or more air outlets via a cooling channel formed between an outer wall of the hollow shaft and an inner wall of the hollow shaft.

9. The method of claim 1, further comprising:
varying the airflow through the electric motor utilizing one or more vent covers to selectively cover and uncover the one or more air inlets.

10. A propulsor to cool an electric motor, the propulsor comprising:
a rotor including blades extending radially from a hub that rotates to propel the propulsor with the blades, one or more of the blades having a first interior passage extending from the hub to one or more air outlets; and
the electric motor, comprising:
a housing including one or more air inlets; and
a shaft mechanically coupled to the hub, wherein the shaft includes a second interior passage that provides a flow path for an airflow through the electric motor from the one or more air inlets to the first interior passage to cool the electric motor.

11. The propulsor of claim 10, wherein:
the rotor is disposed outside the housing of the electric motor.

12. The propulsor of claim 10, wherein:
the electric motor further comprises:
a motor rotor surrounding the shaft; and
a stator surrounding the motor rotor and separated from the motor rotor by an air gap, wherein the air gap provides a flow path for the airflow from the one or more air inlets to the second interior passage in the shaft.

13. The propulsor of claim 12, wherein:
the stator includes interior channels that provide a flow path for the airflow from the one or more air inlets to the second interior passage in the shaft.

14. The propulsor of claim 10, further comprising:
one or more vent covers configured to selectively cover and uncover each of the one or more air inlets individually.

15. The propulsor of claim 10, wherein:
the second interior passage of the shaft includes a helical pattern of walls along an interior surface of the shaft that augment the airflow through the second interior passage of the shaft.

16. The propulsor of claim 10, wherein:
the second interior passage of the shaft comprises a cooling channel formed between an outer wall of the shaft and an inner wall of the shaft, and
the shaft includes a utility channel defined by the inner wall of the shaft that extends through the electric motor and the hub.

17. An aircraft equipped with one or more propulsors for cooling an electric motor, the one or more propulsors comprising:
a rotor including blades extending radially from a hub that rotates to propel the aircraft with the blades, one or more of the blades having an interior passage extending from the hub to one or more air outlets; and
the electric motor, comprising:
one or more air inlets; and
a hollow shaft mechanically coupled to the rotor and open to the interior passage that provides a flow path for an airflow through the electric motor from the one or more air inlets to the one or more air outlets to cool the electric motor.

18. The aircraft of claim 17, wherein:
the electric motor further comprises:
a motor rotor surrounding the hollow shaft; and
a stator surrounding the motor rotor and separated from the motor rotor by an air gap that provides a flow path for the airflow from the one or more air inlets to the hollow shaft.

19. The aircraft of claim 17, wherein:
the hollow shaft includes a helical pattern of walls along an interior surface of the hollow shaft that augments the airflow through the hollow shaft.

20. The aircraft of claim 17, further comprising:
a housing of the electric motor, the housing including the one or more air inlets to receive air from an external environment,
wherein the blades of the rotor are disposed outside the housing of the electric motor, and
wherein the one or more air outlets eject air from the one or more blades into the external environment.

* * * * *